(12) United States Patent
Jaffe et al.

(10) Patent No.: US 7,847,864 B1
(45) Date of Patent: Dec. 7, 2010

(54) ALL DIGITAL RADIO FREQUENCY MODULATOR

(75) Inventors: Steven Jaffe, Irvine, CA (US); Tracy C. Denk, Aliso Viejo, CA (US); Erik Berg, Laguna Beach, CA (US); Amy Hundhausen, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 2393 days.

(21) Appl. No.: 10/372,427

(22) Filed: Feb. 21, 2003

Related U.S. Application Data (60) Provisional application No. 60/360,467, filed on Mar. 1, 2002.

(51) Int. Cl.
*H04N 5/40* (2006.01)

(52) U.S. Cl. ...................................... 348/724

(58) Field of Classification Search ................. 725/131, 725/139, 151; 704/217
See application file for complete search history.

(56) References Cited

U.S. PATENT DOCUMENTS

| | | | | |
|---|---|---|---|---|
| 5,774,857 A | * | 6/1998 | Newlin | ........................ 704/271 |
| 5,793,413 A | * | 8/1998 | Hylton et al. | .................. 725/81 |
| 6,147,713 A | * | 11/2000 | Robbins et al. | ............. 348/555 |
| 6,327,709 B1 | * | 12/2001 | Ovadia et al. | ................ 725/124 |
| 6,418,273 B1 | * | 7/2002 | Lubinski et al. | ............. 386/125 |
| 6,466,277 B1 | * | 10/2002 | McNeely | ..................... 348/724 |
| 6,559,898 B1 | * | 5/2003 | Citta et al. | ................... 348/723 |
| 6,637,937 B2 | * | 10/2003 | Bois | .............................. 383/5 |
| 6,859,238 B2 | * | 2/2005 | Wu | .............................. 348/738 |
| 6,877,043 B2 | * | 4/2005 | Mallory et al. | .............. 709/251 |
| 7,489,362 B2 | * | 2/2009 | Baer et al. | ................... 348/554 |
| 2002/0046406 A1 | * | 4/2002 | Chelehmal et al. | ............ 725/87 |

* cited by examiner

*Primary Examiner*—Paulos M Natnael
(74) *Attorney, Agent, or Firm*—Garlick Harrison & Markison; Shayne X. Short (57) ABSTRACT

All digital RF modulator. An RF modulator, implemented using only digital techniques, obviates the need for an additional board, implemented using discrete analog components, to perform the necessary modulation to provide the RF output signal for use with a display device (television). Modern displays typically include functionality to support a number of input types beyond an RF input. However, older, legacy displays typically only support inputs that are RF in nature. A fully integrated solution that performs the RF modulation of the output signal that may be used in such legacy types systems is provided using digital techniques.

42 Claims, 11 Drawing Sheets integrated all digital RF modulator system

Fig. 2
RF modulator overall block diagram embodiment of a video processing path

Fig. 3

Fig. 4 embodiment of an audio processing path

Fig. 5 embodiment of an upsample block and modulator

Fig. 6

Fig. 7 embodiment of a single chip Set Top Box (STB) Integrated Circuit (IC) (including PVR functionality)

Set Top Box (STB) system using single chip STB IC with RF modulator (including optional PVR functionality)

Fig. 8

Fig. 9 video clock sync loop

Fig. 11 all digital RF modulator method

ALL DIGITAL RADIO FREQUENCY MODULATOR

CROSS REFERENCE TO RELATED PATENTS/PATENT APPLICATIONS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 60/360,467, entitled "All digital radio frequency modulator," filed Mar. 1, 2002, pending.

BACKGROUND OF THE INVENTION

1. Technical Field of the Invention

The invention relates generally to communication systems; and, more particularly, it relates to ways in which modulators may be implemented within communication systems.

2. Description of Related Art

Existing television (TV) sets typically have numerous input signal types that they can use. However, older TV models may only have a Radio Frequency (RF) input. When using a Set Top Box (STB) to create a video source, a method is needed to get the video signal to the TV. The method used is to modulate the baseband signal to a selectable television channel. For example, North American STBs often modulate to the assigned Channel 3 or Channel 4 Radio Frequencies (RFs). The modulation is typically performed using analog techniques, via discrete components. The prior art approach to implementing the interface to a display requiring a RF modulated input signal has typically been to include these discrete components on a board that interfaces to an output port of a device. This has proven to be a highly expensive endeavor as a relatively large amount of cost is associated with the RF input interface.

Further limitations and disadvantages of conventional and traditional systems will become apparent through comparison of such systems with the invention as set forth in the remainder of the present application with reference to the drawings.

BRIEF SUMMARY OF THE INVENTION

Various aspects of the invention can be found in an integrated all digital RF modulator system. An RF modulator, implemented using only digital techniques, obviates the need for an additional board, implemented using discrete analog components, to perform the modulation to provide the RF output signal for use with a display device (television). Modern displays typically include functionality to support a number of input types. Older, legacy displays typically only support inputs that are RF in nature. A fully integrated solution that performs the RF modulation of the output signal using digital techniques is provided.

In one embodiment, the present invention may also be found within a single chip Set Top Box (STB) Integrated Circuit (IC). In other words, a single integrated circuit, that supports the functionality of a STB, may include the functionality of the invention. This single chip STB IC may also be implemented to include Personal Video Recording (PVR) functionality. The single chip STB IC may include performing all digital techniques to generate a RF modulated signal for use with any device that may use the RF modulated signal. Legacy display systems often can only accept a single input in the form of a RF modulated signal. The present invention employs a highly compacted, efficient implementation using all digital techniques to perform the RF modulation of an encoded audio/video signal for use by such a system that may accept the RF modulated signal. The device that receives the RF modulated signal may be a legacy display device that may include a single input port (RF input); alternatively, the device may be a device having multiple input functionality that is also able to receive the RF modulated signal as an input in addition to other types of inputs. Examples of other types of inputs are composite video, S-video, or component video.

The present invention may also be found within a method that performs RF modulation of an encoded signal for output transmission to a device that is operable to receive the RF modulated signal. The method is performed using all digital techniques.

The above-referenced description of the summary of the invention describes some of the various aspects of the present invention. The claims are directed to these and also to additional aspects of the subject matter towards which the present invention is directed. In addition, other aspects, advantages and novel features of the invention will become apparent from the following detailed description of the invention when considered in conjunction with the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

The baseband video signal is first filtered to pre-compensate for the group delay distortion in the receiver. Then, the video is filtered to remove any signal components in the audio carrier frequency band. The signal is then scaled and shifted to meet the depth of modulation requirements. The frequency modulation (FM) modulated audio signal is then added to the video signal. The sum (audio+video) signal is then sample rate converted to a high frequency sample rate. The signal is then modulated to the desired RF frequency.

The present invention provides for a new method that is suitable for integration onto set top chips. It reduces board level components, thereby reducing cost. The new, all digital RF modulator also has more flexibility and control than prior art approaches employing various discrete analog components. Multiple modulation formats [e.g., NTSC (National Television System Committee), PAL (Phase Alternating Line), SECAM (Systeme Electronique Couleur Avec Memoire or SEquential Color And Memory)] can be employed using the all digital RF modulation that may be performed according to the present invention.

Figure 1A:
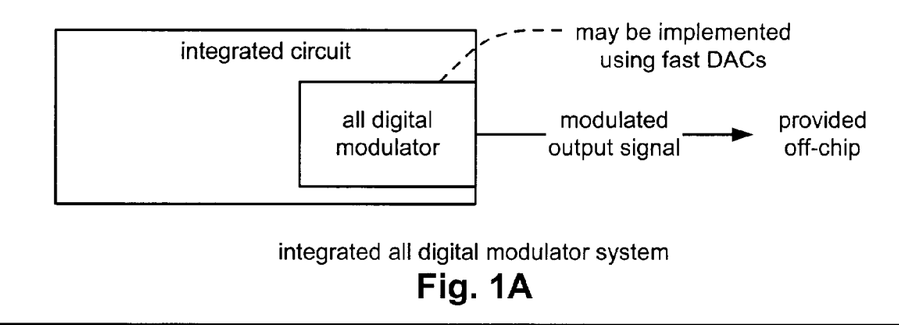
FIG. 1A is a system diagram illustrating an embodiment of an integrated all digital modulator system that is built according to the present invention.

FIG. 1A is a system diagram illustrating an embodiment of an integrated all digital modulator system that is built according to the present invention. The FIG. 1A shows a very generic implementation of the invention, from a high level, of generating a signal using all digital techniques within an integrated circuit. The all digital modulator, within the integrated circuit, may be viewed as being an integrated Digital Signal Processor (DSP) functional block. In addition, very fast Digital to Analog Converters (DACs) may be implemented within the integrated circuit to transform the digitally-generated modulated output signal (being initially in a digital format) into a modulated, analog signal that may be provided to another device. For example, the modulated output signal is shown as being provided off chip (that is to say, provided to a device and/or other integrated circuit) that is external to the integrated circuit shown as having the all digital modulator.

Figure 1B:
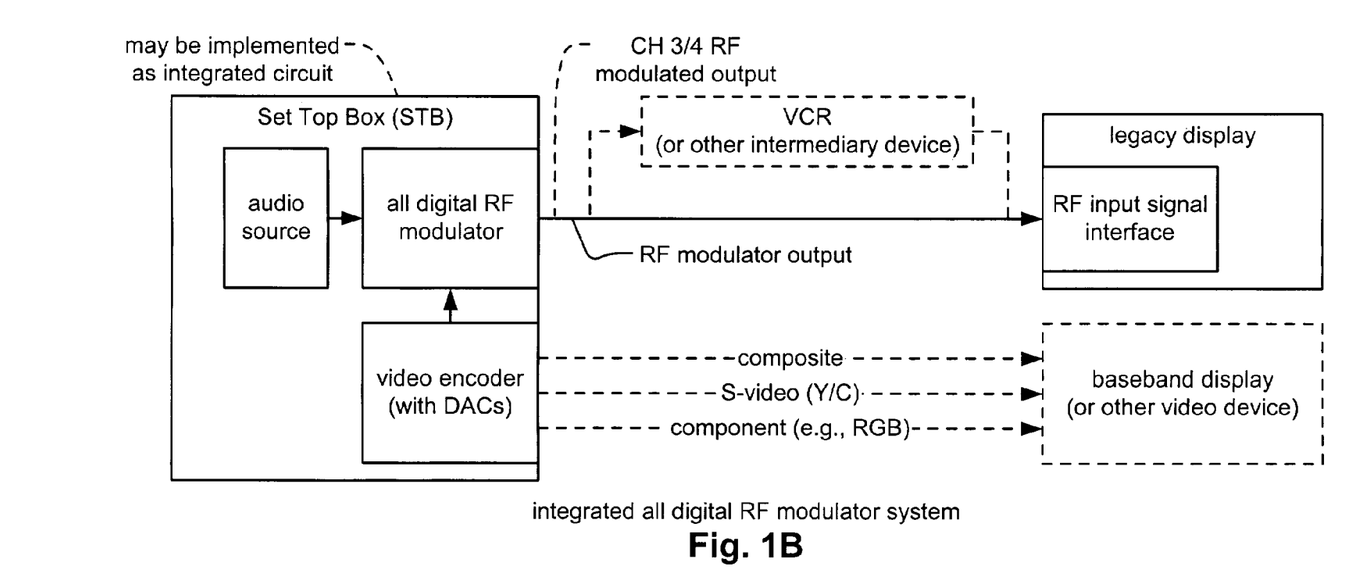
FIG. 1B is a system diagram illustrating an embodiment of an integrated all digital RF modulator system that is built according to the present invention.

FIG. 1B is a system diagram illustrating an embodiment of an integrated all digital RF modulator system that is built according to the present invention. A Set Top Box (STB) interfaces with at least one of a legacy display and/or a baseband digital display. A single integrated circuit, that supports the functionality of the STB shown within this embodiment, may include the functionality of the invention of including an integrated, all digital RF modulator.

The legacy display requires the use of a Radio Frequency (RF) input signal (that may be referred to as an RF modulator output signal from the perspective of the STB).

The legacy display requires the use of a Radio Frequency (RF) input signal (that may be referred to as an RF modulator output signal from the perspective of the STB). This RF modulated output signal may be implemented as being a channel 3/4 RF modulated audio/video signal in some embodiments for compatibility with the assigned Channel 3 or Channel 4 Radio Frequencies (RFs).

It is important to note that while the receiver module is typically a display device, the receiver module may also include non-display audio/video (A/V) devices that are able to receive the RF modulator output signal, such as a Video Cassette Recorder (VCR) or some other type of intermediary device. For the remainder of the present application, the receiver A/V device is assumed to be a display device. The STB includes an all digital RF modulator that is able to generate the RF modulator output signal that is required as an input to the legacy display. The all digital RF modulator itself may be viewed as being an integrated Digital Signal Processor (DSP) functional block. The legacy display includes a RF input signal interface that is able to receive the RF modulator output signal from the all digital RF modulator of the STB. The legacy display may be viewed as being an older television (TV) model, or any other display, that may receive an RF input. In a display device that includes functionality for both baseband inputs as well as RF-modulated inputs, there may be times when the RF input may be preferred. The present invention allows for selecting either of the outputs from the STB. The present invention shows, for the first time, a fully integrated digital RF modulator that may be implemented in CMOS (Complementary Metal Oxide Semiconductor), as part of a single chip STB. In other words, an integrated circuit that includes the STB functionality may be fabricated using CMOS processing.

The present invention allows for backward compatibility with the number of legacy displays that are still in use today. A video encoder and an audio encoder are operable to provide digital signals to the all digital RF modulator, within the STB, so that the all digital RF modulator may generate the appropriate RF modulator output signal for use with the legacy display.

However, the STB also includes the ability to provide composite, S-video, and/or component video (for example, red/green/blue or RGB) outputs for use within a baseband digital display. The video encoder (with its Digital to Analog Converters (DACs)) is able to produce a signal into one of these formats for output to the baseband display. The baseband display may include a number of devices such as a High Definition Television (HDTV), a computer, or other display that may accept as input a signal in one or more formats. Composite video, S-video, and/or component video are illustrative of some of the many types of signals that may be provided by the STB to the baseband display. It is also noted that the display, if equipped with a RF modulated analog input port, would also be capable of receiving the RF modulator output as well.

Figure 2:
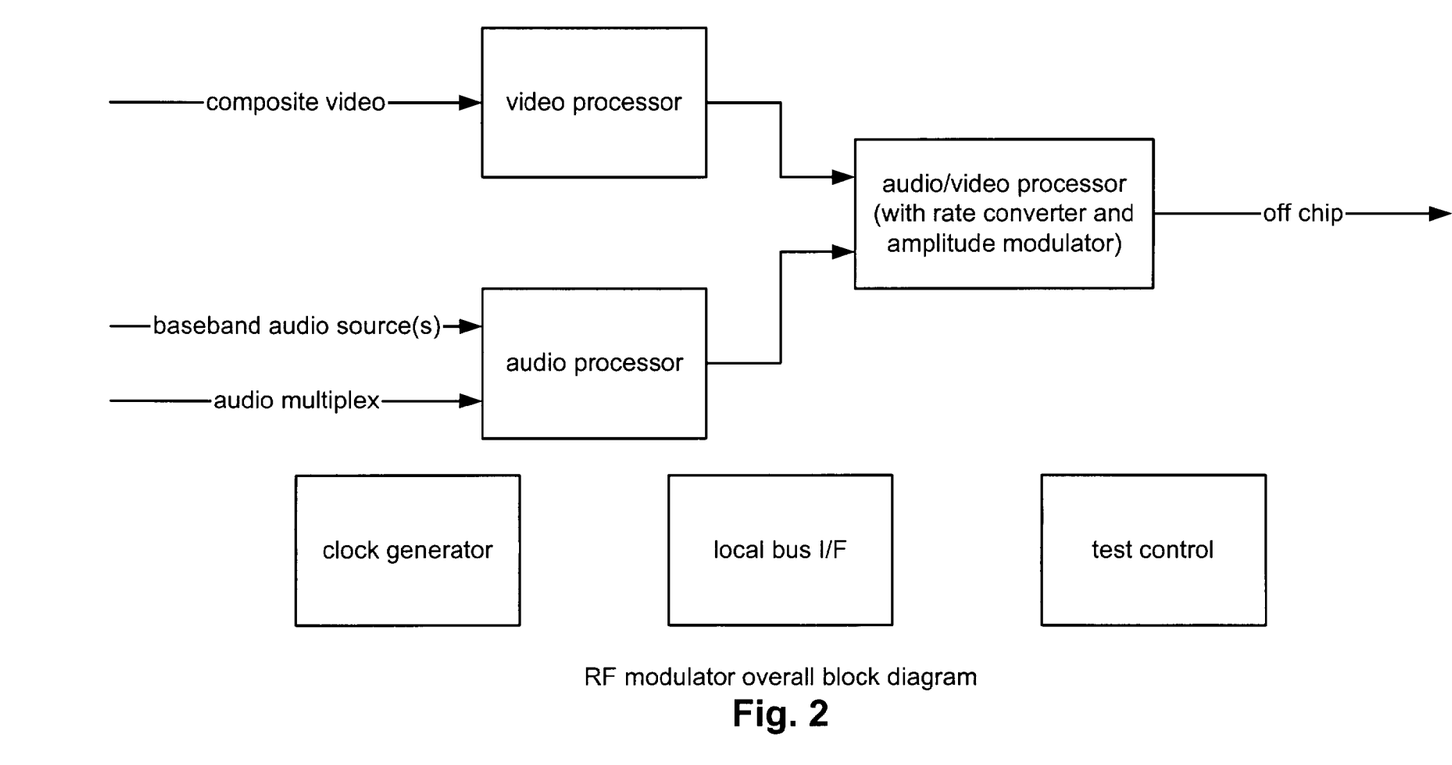
FIG. 2 is an overall block diagram illustrating an embodiment of an RF modulator that is built according to the present invention.

FIG. 2 is an overall block diagram illustrating an embodiment of an RF modulator that is built according to the present invention. The RF modulator receives, as input, a composite video signal and one or more baseband audio source signals (such as PCM (Pulse Code Modulation) in one embodiment) and/or an audio "multiplex" signal (such as BTSC (Broadcast Television Systems Committee) in one embodiment). The baseband video signal is first filtered to pre-compensate for the group delay distortion in the receiver. Then, the video is filtered to remove any signal components in the audio carrier frequency band. The signal is then scaled and shifted to meet the depth of modulation requirements. The Frequency Modulation (FM) modulated audio signal is then added to the video signal. The sum (audio+video) signal is then sample rate converted to a high frequency sample rate. The signal is then modulated to the desired RF frequency.

A video processor receives the composite video and, after video processing, provides an output to an audio/video processor. An audio processor receives audio signals and, after audio processing, provides an output to the audio/video processor. The audio/video processor provides an off chip signal.

The RF modulator also includes a clock generator, a local bus interface, and a test control portion that supports additional corresponding functionality.

Figure 3:
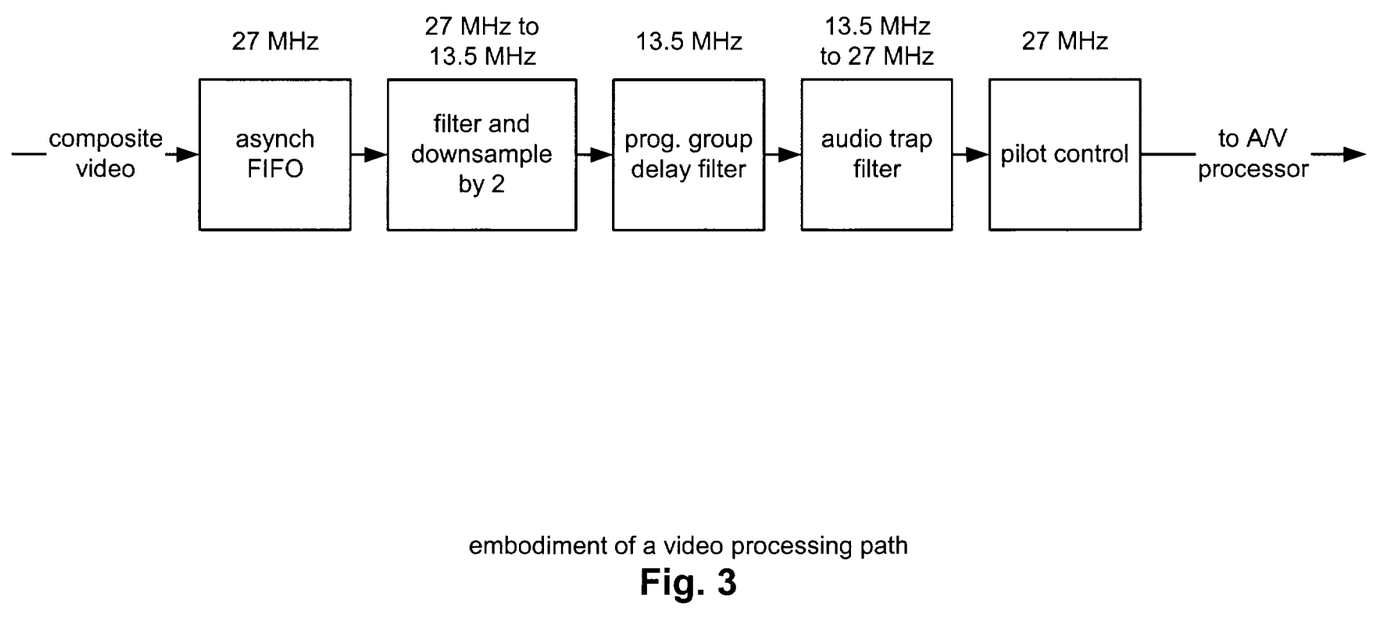
FIG. 3 is a diagram illustrating an embodiment of a video processing path that is employed according to the present invention.

FIG. 3 is a diagram illustrating an embodiment of a video processing path that is employed according to the present invention. A composite video signal is provided to an asynchronous FIFO (First In/First Out device) that operates at 27 MHz. Then, the output signal of the asynchronous FIFO is decimated by a factor of 2 in another functional block. This includes reducing the sampling rate from 27 MHz to 13.5 MHz. Then, a programmable group delay filter consisting of a digital filter compensates the decimated output signal for the specific group delay requirements. An audio trap filter, also consisting of a digital filter, attenuates video components in the audio carrier frequency band. More specifically, the audio trap filter is operable to attenuate video signals in a frequency range of an audio signal that contains an audio FM (Frequency Modulation) carrier. This audio signal may be either one or both of a baseband audio signal and/or an audio multiplex signal that contains the audio FM carrier. A pilot control functional block provides an output signal to an A/V (Audio/Video) processor. The video processing path may be viewed as being performed within the video processor of the FIG. 2, and the output signal provided to an A/V processor, as shown in the FIG. 3, may be viewed as being provided to the audio/video processor of the FIG. 2.

The preceding and following figures described herein show some examples of the various frequencies at which a device operating in accordance with the invention may operate. It is clear that the particular values shown herein may be altered without departing from the scope and spirit of the invention; these particular values are exemplary of just some of the possible embodiments in which the invention may be implemented.

Figure 4:
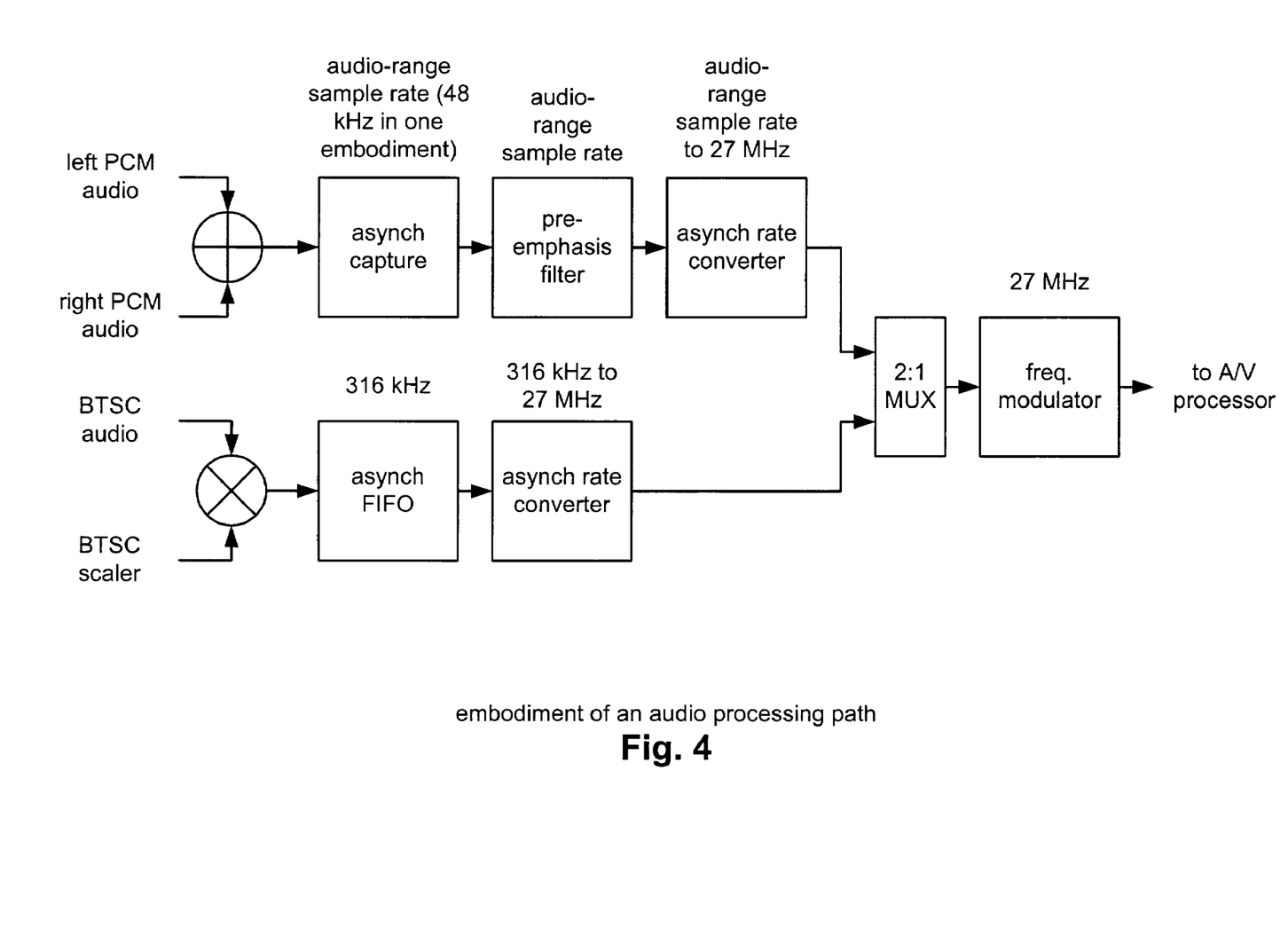
FIG. 4 is a diagram illustrating an embodiment of an audio processing path that is employed according to the present invention.

FIG. 4 is a diagram illustrating an embodiment of an audio processing path that is employed according to the present invention. Left and right PCM audio signals are provided to a summer and then provided to an asynchronous capture functional block that operates at a programmable audio-range sample rate (for example, 48 kHz in one embodiment). A pre-emphasis filter, also operating at the same audio-range sample rate, receives the output of the asynchronous capture functional block, and provides output to an asynchronous rate converter that changes the rate from the audio-range sample rate to 27 MHz. The output of the asynchronous rate converter is provided to a 2:1 MUX (multiplexor).

In one embodiment, a BTSC audio signal is scaled by a BTSC scalar in a scaling node and the output is then provided to an asynchronous FIFO that operates at 316 kHz. An asynchronous rate converter then changes the rate from 316 kHz to 27 MHz. Other types of audio multiplex signals could be provided to the asynchronous FIFO in other embodiments. The output of the asynchronous rate converter is also provided as an input to the 2:1 MUX as well. The output of the 2:1 MUX is provided to a frequency modulator that operates at 27 MHz. The output of the frequency modulator is provided to an A/V processor. The audio processing path may be viewed as being performed within the audio processor of the FIG. 2, and the output signal provided to an A/V processor, as shown in the FIG. 4, may be viewed as being provided to the audio/video processor of the FIG. 2.

Figure 5:
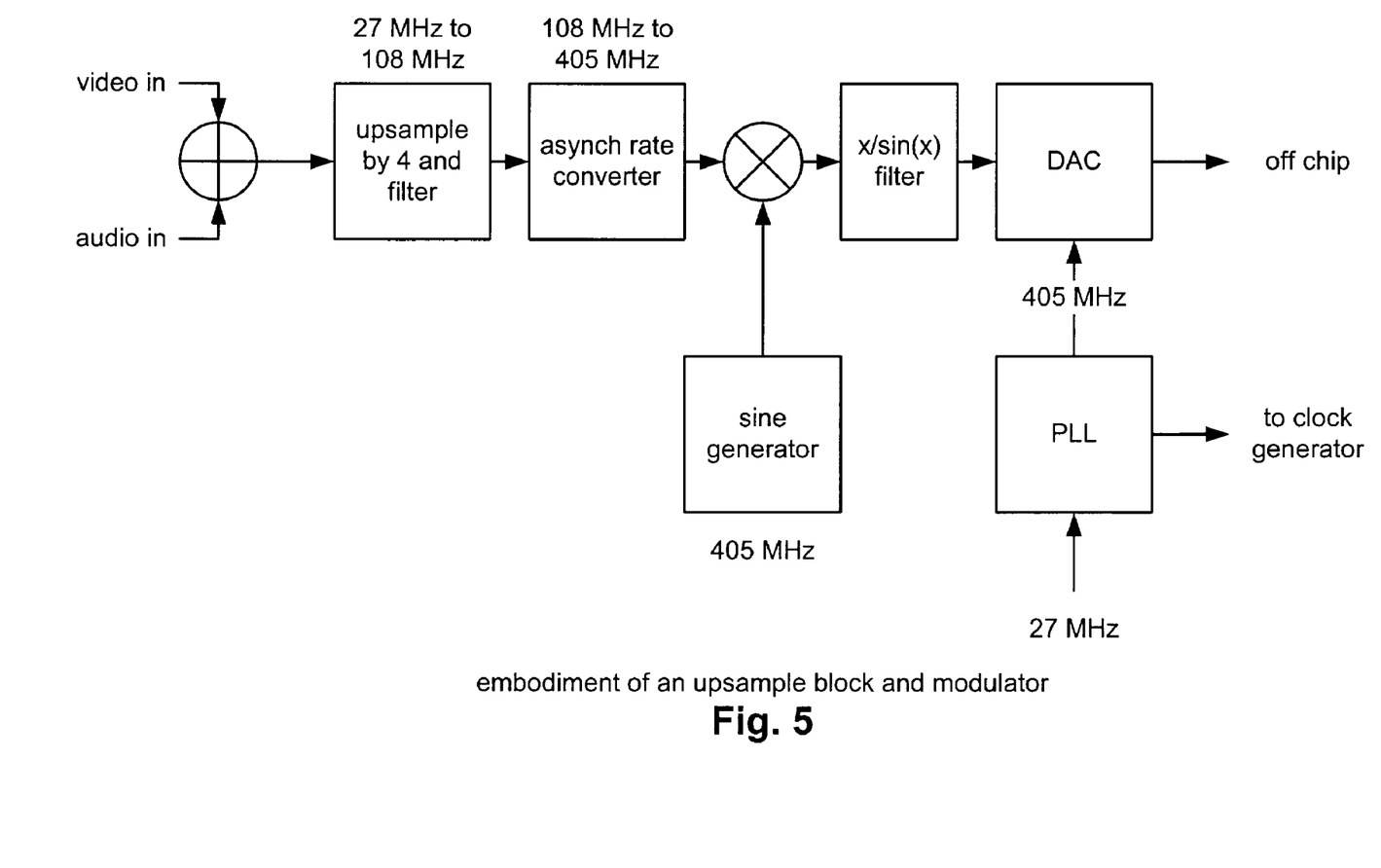
FIG. 5 is a diagram illustrating an embodiment of an upsample block and modulator that is arranged according to the present invention.

FIG. 5 is a diagram illustrating an embodiment of an upsample block and modulator that is arranged according to the present invention. The upsample block and modulator receives video and audio input signals, combines them into a single signal, and then interpolates that signal by a factor of 4, from 27 MHz to 108 MHz. An asynchronous (asynch) rate converter then changes the data sample rate from 108 MHz to 405 MHz. The output of a sine generator, operating at 405 MHz, is combined with the output from the asynchronous rate converter. The output from this mixing node is provided to an x/sin(x) functional block. The output of the x/sin(x) functional block is provided to a DAC. The output of the DAC may then be provided off chip. A PLL (Phase Locked Loop), that itself receives a reference signal of 27 MHz, provides an output signal of 405 MHz to the DAC. An output of the PLL is provided to a clock generator. The clock generator may be viewed as being the clock generator of the FIG. 2.

Figure 6:
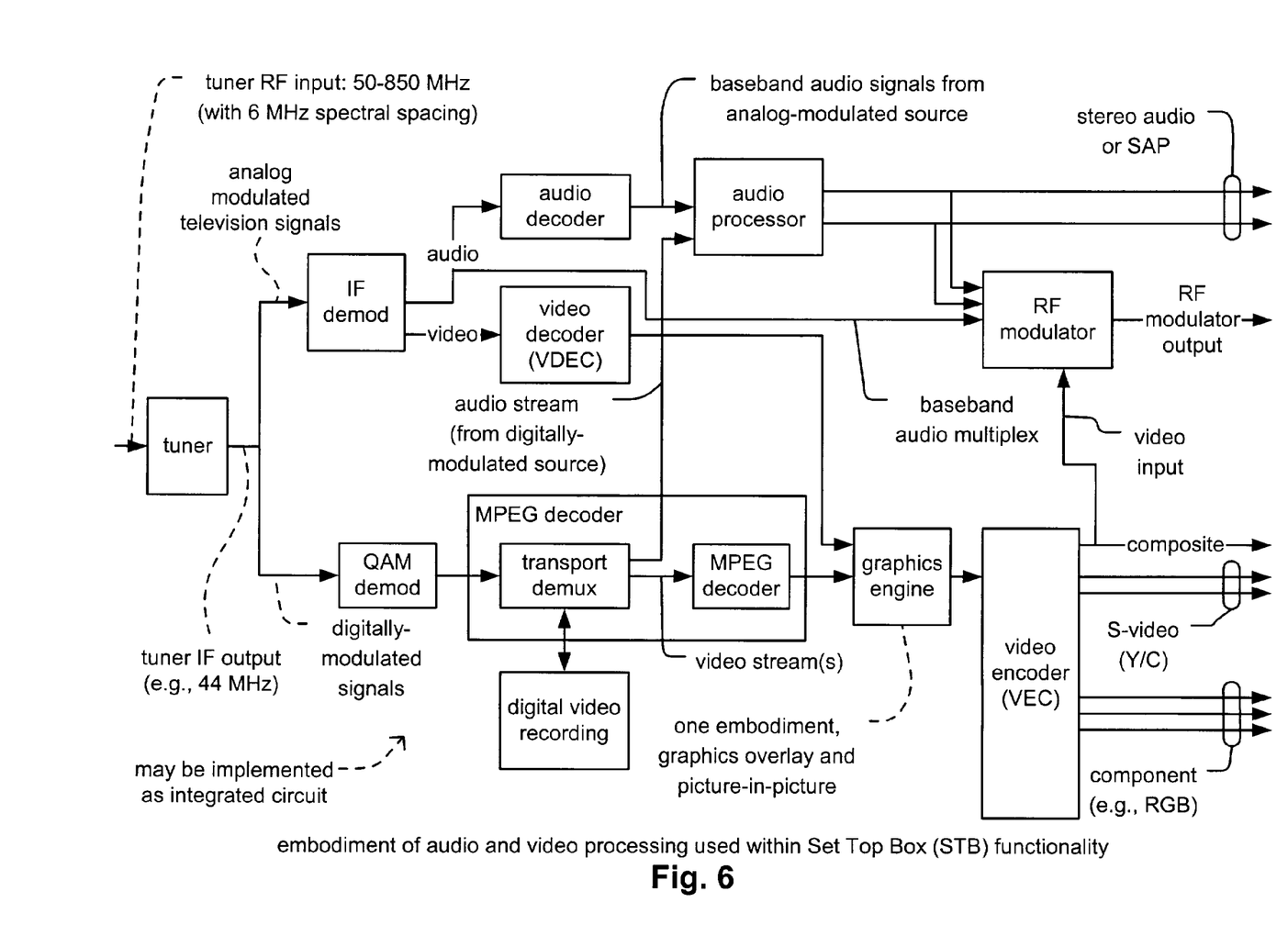
FIG. 6 is a diagram illustrating an embodiment of the audio and video processing used for a Set Top Box (STB) that is built according to the present invention.
Figure 7:
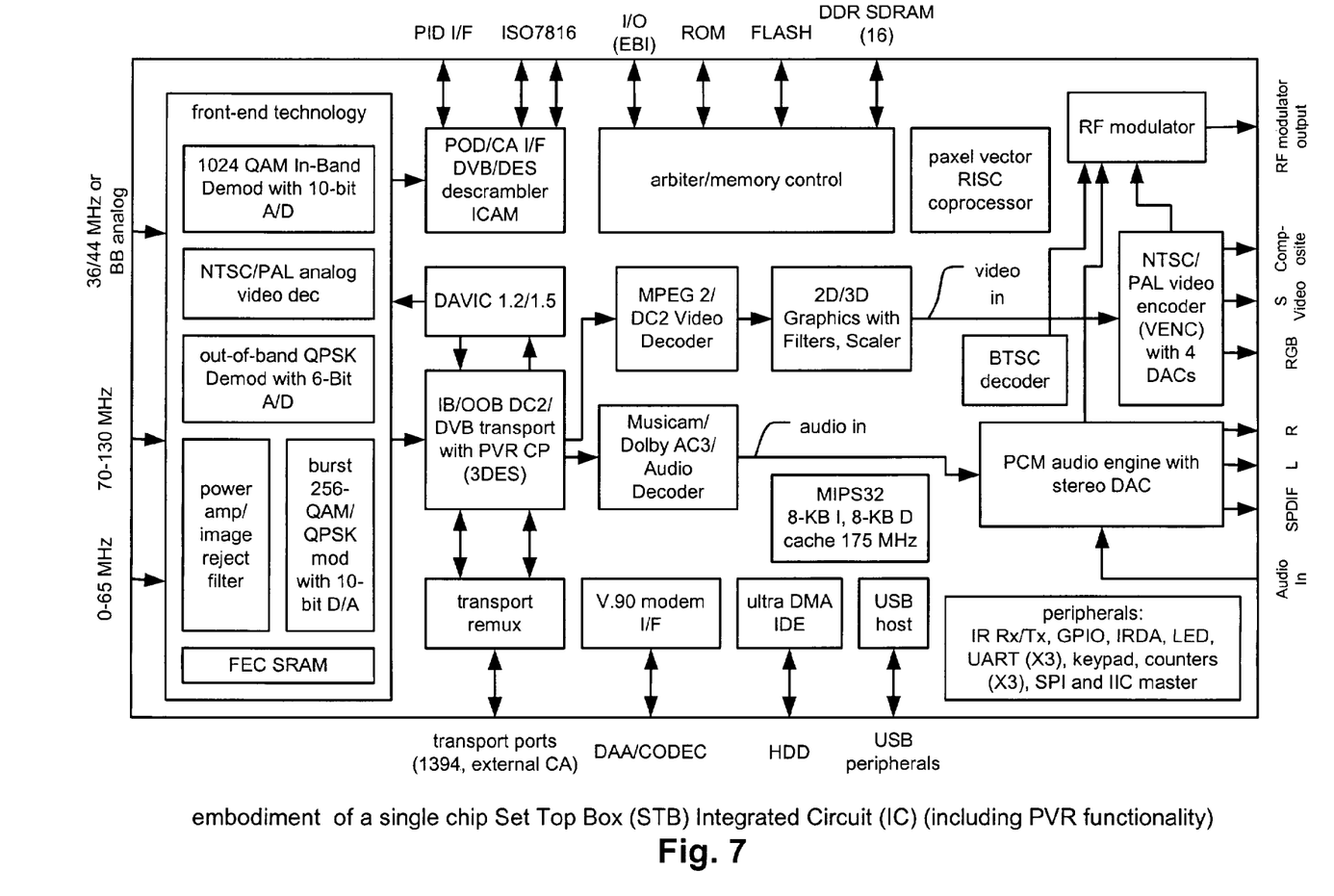
FIG. 7 is a diagram illustrating an embodiment of a single chip Set Top Box (STB) Integrated Circuit (IC) (including Personal Video Recording (PVR) functionality) that is built according to the present invention.
Figure 8:
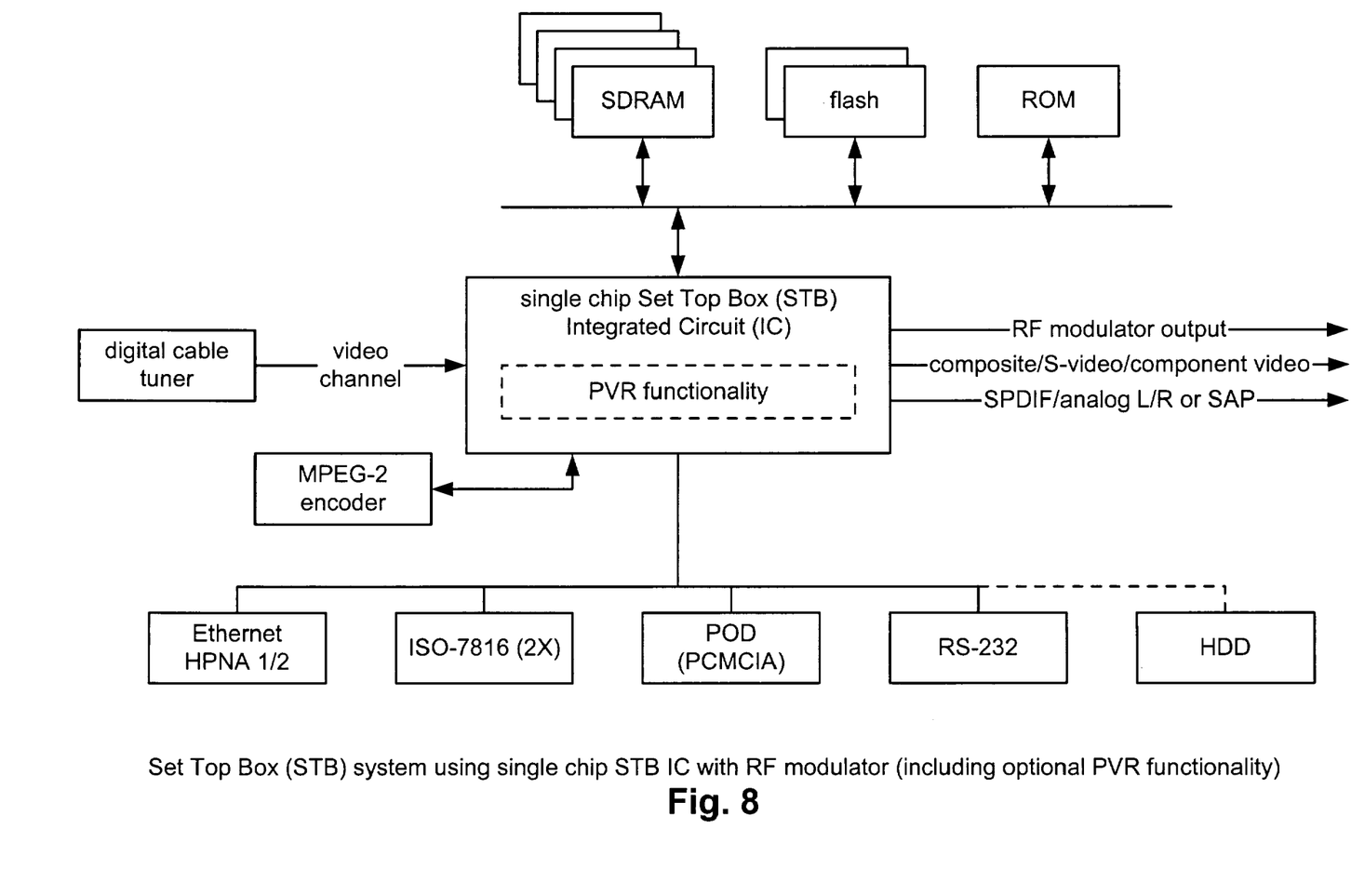
FIG. 8 is a diagram illustrating an embodiment of a Set Top Box (STB) (shown in this embodiment as including an optional Personal Video Recording (PVR) functional block), using a single-chip set top box (STB) Integrated Circuit (IC), that is built according to the present invention.

The following FIGS. 6, 7, and 8 show possible embodiments of devices that may be implemented to support the all digital Radio Frequency (RF) modulator described herein. While it is noted that a variety of devices may be implemented to support the functionality of the all digital RF modulator, it is again noted that these embodiments represent just some of the possible types of devices that may benefit from the invention.

FIG. 6 is a diagram illustrating an embodiment of a Set Top Box (STB) that is built according to the present invention. An input signal is received by the STB system where it is initially processed by a tuner. A single integrated circuit, that supports the functionality of the STB shown within this embodiment, may include the functionality of the invention of including an integrated, all digital RF modulator.

The tuner receives, in some embodiments, an RF input within the frequency spectrum of 50-850 MHz (with 6 MHz channel spectral spacing). The output of the tuner is an intermediate-frequency (IF) modulated signal located, for example, at approximately 44 MHz. After the tuner, the STB may be viewed as processing either analog-modulated television sources (the branch that drives the IF demodulator) or digitally-modulated sources (the branch that drives the QAM demodulator).

The IF demodulator provides output to an audio (for example, BTSC) decoder and to a video decoder (VDEC). The IF demodulator also provides an audio multiplex signal to the all digital RF modulator. This signal path creates a mode in which the audio multiplex or other audio signal is passed directly to the RF modulator without passing through the audio decoder or audio processor. The audio decoder provides baseband audio output signals to an audio processor. The all digital RF modulator may be viewed as being an integrated Digital Signal Processor (DSP) functional block. The audio processor provides stereo (sometimes referred to as Left/Right (or L/R)) and/or Secondary Audio Program (SAP) output which is also provided to the all digital RF modulator. The video decoder (VDEC) provides a baseband composite video signal to a graphics engine portion of the STB.

The QAM demodulator provides a demodulated signal to an MPEG (Motion Picture Expert Group) decoder that includes both a transport demultiplexor (demux) and an MPEG decoder functional block. The transport demultiplexor (demux) provides one or more video streams to the MPEG decoder. The transport demultiplexor (demux) interacts with a digital video recording functional block to receive one or more of the possible video streams that may be provided to the MPEG decoder. It is also noted that the transport demultiplexor (demux) may also provide a digital audio output signal to the audio processor of the STB.

The output of the MPEG decoder functional block of the MPEG decoder is provided to a graphics engine that may support a variety of different video processing functions including graphics overlay and/or picture-in-picture functionality in various embodiments. The graphics engine output is provided to a video encoder (VENC) that provides one or more types of output encoded video signals for subsequent use by one or more types of video displays. Examples of the types of output signals that may be output from the video encoder (VENC) include Composite video, S-video (Y/C), and/or component video outputs for use with a baseband display or other device capable of processing baseband video. This figure shows one embodiment where an all digital RF modulator may be implemented within a STB according to the invention.

FIG. 7 is a diagram illustrating an embodiment of single chip Set Top Box (STB) Integrated Circuit (IC) (including Personal Video Recording (PVR) functionality) that is supported according to the present invention. This embodiment of a single chip STB IC, shown here as including PVR functionality, combines the key aspects required for the next generation of STBs including cost-effective single chip design, PVR (a function increasingly desired by many customers), communication via DAVIC (Digital Audio Video Council) protocol and/or other protocols, and support of all major physical layer (PHY) standards for worldwide deployment.

A single integrated circuit, that supports the functionality of the STB shown within this embodiment, may include the functionality of the invention of including an integrated, all digital RF modulator with sound trap.

The single chip STB integrated circuit with PVR functionality includes a 1024-QAM (Quadrature Amplitude Modulation) receiver, an out-of-band QPSK (Quadrature Phase Shift (ed) Keying) receiver and a QPSK/16-QAM/256-QAM upstream burst modulator. All major physical layer (PHY) standards are supported herein for deployment worldwide. The device includes a complete DAVIC 1.2/1.5 MAC (Medium Access Controller) for interactive services.

The single chip STB integrated circuit with PVR functionality also includes a standard definition MPEG-2 video decoder and 2-D/3D graphics subsystem. This allows for the display of studio quality text/graphics and 3D effects. The DVB/DCII transport of the device supports PVR. This support includes time shifting on the program being viewed and recording of another program, simultaneously.

A full PCM audio engine for mixing sounds into the main audio stream is also on chip. Outputs include SPDIF (Sony Philips Digital Interface Format).

The single chip STB integrated circuit with PVR functionality also contains a high performance MIPS32 RISC (Reduced Instruction Set Computer) processor with 8-KB I cache and 8-KB D cache.

The single chip STB integrated circuit with PVR functionality includes support for a number of peripherals required for next generation STBs, including USB (Universal Serial Bus) host, IDE (Integrated Drive Electronics) controller for connection to disk drives, POD (Point of Deployment) interface for external conditional access, and a glueless 1394 interface. The single chip STB integrated circuit with PVR functionality also contains support for a V.90 soft modem.

On board de-scrambling supports all major conditional access systems and includes 3DES encryption/decryption for PVR.

The single chip STB integrated circuit with PVR functionality includes an all digital RF modulator with sound trap that is operable to provide an RF modulated output signal to a display that is operable to receive an RF modulated signal. The all digital RF modulator with sound trap is fully integrated within the single chip STB integrated circuit with PVR functionality in CMOS thereby provided for a highly compact and inexpensive solution. Moreover, the all digital RF modulator with sound trap may be viewed as being an integrated DSP functional block within the single chip STB integrated circuit.

The present invention, as shown within the various embodiments including the single chip STB integrated circuit with PVR functionality, represents a most integrated, cost effective single chip solution incorporating next generation requirements. It may be built on previous generation silicon and software to offer a low risk and quick time to market for interactive broadband STBs.

FIG. 8 is a diagram illustrating an embodiment of a television Set Top Box (STB) (shown in this embodiment as including an optional Personal Video Recording (PVR) functional block) that is built according to the present invention. A single Integrated Circuit (IC) that supports the functionality of the STB shown within this embodiment may include the functionality of the invention that includes an integrated, all digital RF modulator.

The single chip STB is operable to provide S-video/composite video/component video outputs and/or SPDIF (Sony Philips Digital Interface Format) and analog L/R (Left/Right) and/or SAP audio outputs. The single chip STB IC may also be implemented to include the optional PVR functionality therein. In addition, the single chip STB IC is operable to provide an RF modulated output signal for use within a device that is operable to receive, as input, the RF modulated output signal. The RF modulated output signal may be achieved by using an all digital RF modulator according to the invention. Again, this all digital RF modulator may be viewed as being an integrated DSP functional block. An MPEG-2 (Motion Picture Expert Group, the 2 indicating an improved compression method compared to MPEG-1) digital video/audio encoder communicatively couples to the single chip STB. The MPEG-2 digital video/audio encoder provides for a single chip NTSC/PAL MPEG-2 encoding system.

In addition, a number of other functional blocks may interface with the single chip Set Top Box (STB) Integrated Circuit (IC). For example, these blocks may include an Ethernet HPNA (Home Phoneline Network Alliance) functional block, an ISO-7816 (2×) (International Standards Organization) functional block, a POD (PCMCIA) functional block, and/or an RS-232 functional block, and may sometimes include a HDD (Hard Disk Drive) functional block.

This single chip STB shows yet another embodiment of how an all digital RF modulator may be implemented in accordance with the invention. Other variations are included within the scope and spirit of the invention as well. The single chip STB integrated circuit is operable to support an all digital RF modulator for that may be used by displays that may use an RF modulated input signal.

The all digital RF modulator shows a new approach to implementing a RF modulator on a single integrated CMOS chip. The present invention shows, for the first time, a fully integrated digital RF modulator that may be implemented in CMOS, as part of a single chip STB integrated circuit.

Figure 9:
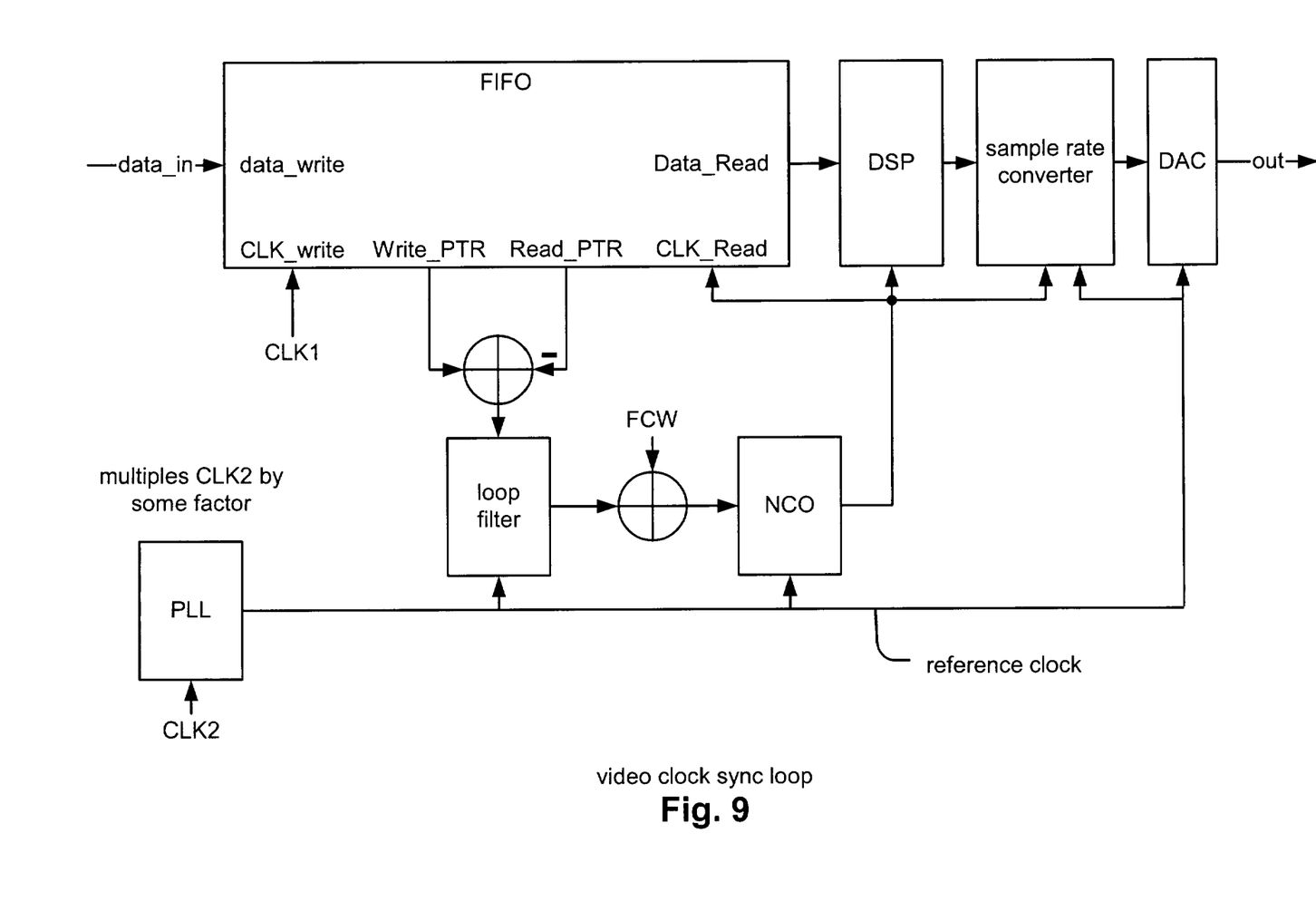
FIG. 9 is a diagram illustrating another embodiment including a video clock synchronization loop that is arranged according to the present invention.

FIG. 9 is a diagram illustrating another embodiment including a video clock synchronization loop that is arranged according to the present invention. There are two different modes in which the all digital RF modulator can function: synchronous and asynchronous. In the synchronous mode, the RF modulator's reference clock (i.e. the output of its Phase Locked Loop) is frequency "locked" to the frequency of the video signal that is input to the RF modulator. In this mode, all clocks that are used in the digital portion of the RF modulator circuit are fixed multiples of the RF modulator reference clock and are therefore also frequency "locked" to the frequency of the incoming video signal.

In the asynchronous mode, the frequency of the RF modulator reference clock is not "locked" to the frequency of the incoming video signal. In this asynchronous mode, the synchronization loop and sample rate converter provide a mechanism that allows the output data of the sample rate converter to be synchronized with the RF modulator reference clock, even though its input data is asynchronous relative to this clock.

A data in signal is provided to a FIFO at a rate set by CLK1. Data is filled into the FIFO using one clock (CLK_Write shown as being CLK1) and is pulled out with another clock (CLK_Read). It is noted that the average rates of these clocks (CLK1 and CLK_Read) must match for the circuit to function correctly. A feedback loop uses the Numerically Controlled Oscillator (NCO) to create the CLK_Read clock such that its average rate matches that of CLK1.

The Phase Locked Loop multiplies CLK2 by some factor to create the RF modulator reference clock. This clock is used as the clock for the loop filter, the NCO, and the DAC. The NCO also provides control information to the sample rate converter. A Frequency Control Word (FCW) sets the open-loop frequency of the NCO output.

The output signal read from the FIFO is provided to a Digital Signal Processor (DSP) functional block. The DSP block and sample rate converter represent two portions of the data path of the all digital RF modulator that is constructed according to the present invention. The output of the DSP block is provided to a sample rate converter which processes the data (which is synchronous with the NCO clock) so that its output data is synchronous with the RF modulator reference clock. The sample rate converter provides its output to a DAC that performs the necessary digital to analog conversion for outputting an output analog signal.

The video clock synchronization loop described herein shows yet another embodiment of how the all digital, RF modulator may be implemented to support operation within an asynchronous system. The integrated, all digital implementation nature of the invention may also be extended to other systems as well.

Figure 10:
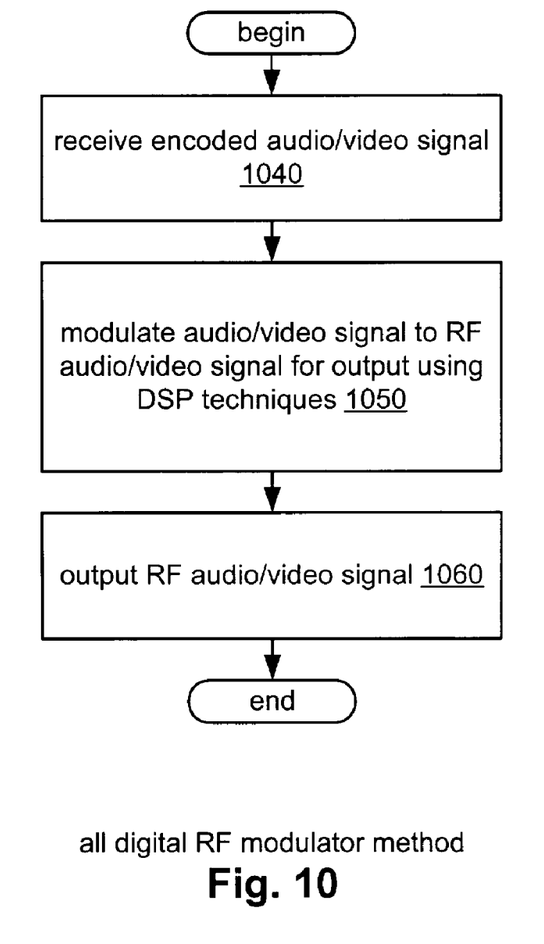
FIG. 10 is an operational flow illustrating an embodiment including an all digital RF modulator method that is performed according to the present invention.

FIG. 10 is an operational flow illustrating an embodiment including an all digital RF modulator method that is performed according to the present invention. In a block 1040, an encoded audio/video signal is received. Then, this received encoded audio/video signal is modulated to an RF audio/video signal using digital signal processing (DSP) techniques, as shown in a block 1050. Ultimately, as shown in a block 1060, this RF audio/video signal, that has been modulated using all digital techniques (within the block 1050), is output for use in a device that is operable to receive the RF audio/video signal.

Figure 11:
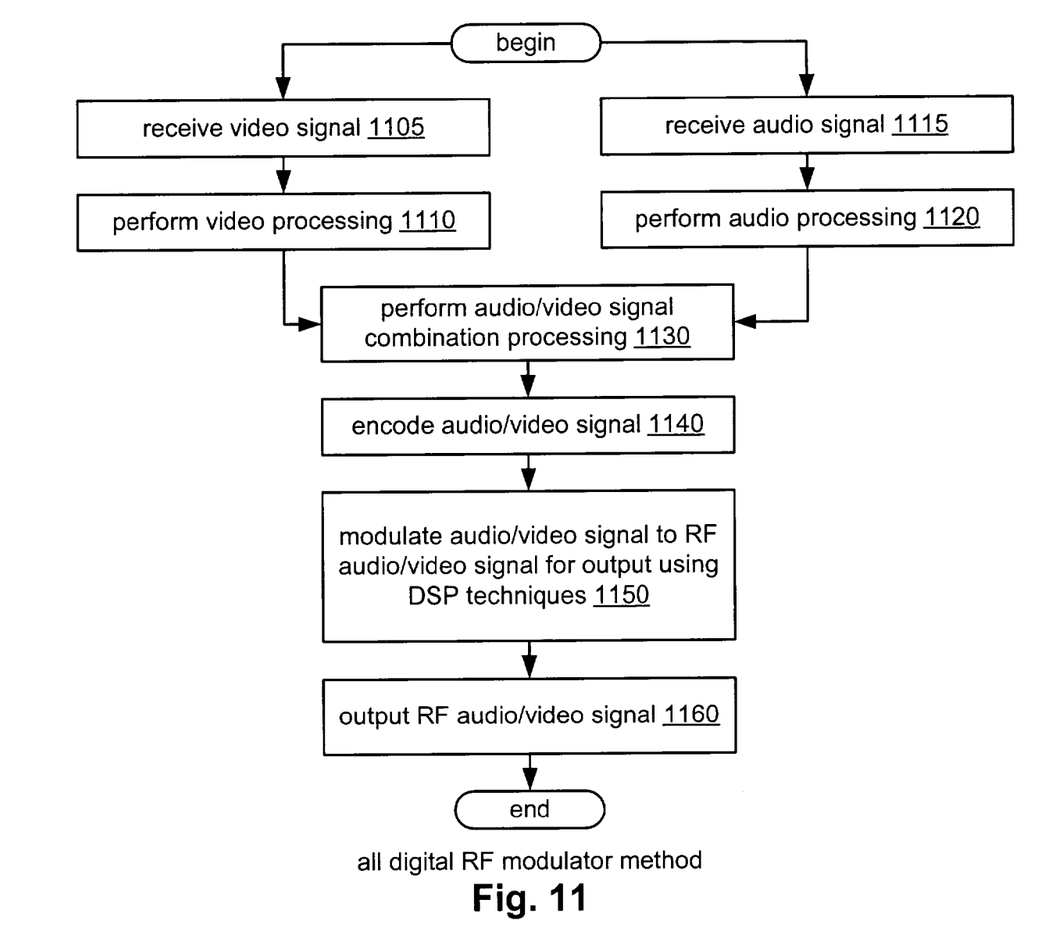
FIG. 11 is an operational flow illustrating another embodiment including an all digital RF modulator method that is performed according to the present invention.

FIG. 11 is an operational flow illustrating an embodiment including another all digital RF modulator method that is performed according to the present invention. In a block 1105, a video signal is received, and then that video signal undergoes processing as shown in a block 1110. Similarly in what may be performed during parallel simultaneously operations, an audio signal is received as shown in a block 1115, and that received audio signal undergoes processing as shown in a block 1120. The operations of the block 1105 and 1110 may be viewed as being the functional operations described within the video processing path of the FIG. 3 in certain embodiments. The method described within the blocks 1105 and 1110 may be viewed as being a method that performs video processing according to the present invention. Similarly, the operations of the block 1115 and 1120 may be viewed as being the functional operations described within the audio processing path of the FIG. 4 in certain embodiments. The method described within the blocks 1105 and 1110 may be viewed as being a method that performs audio processing according to the present invention.

Then, as shown in a block 1130, the now processed audio and video signals undergo combination processing to generate a single audio/video signal. This combination processing of the block 1130 may be performed using the audio/video processor within the RF modulator overall block diagram of the FIG. 2. Alternatively, this combination processing of the block 1130 may be performed using the upsample block functionality described within the upsample block and modulator of the FIG. 5.

This single audio/video signal is then encoded as shown in a block 1140. Then, this now encoded audio/video signal is modulated to an RF audio/video signal using digital signal processing (DSP) techniques, as shown in a block 1150. Ultimately, as shown in a block 1160, this RF audio/video signal, that has been modulated using all digital techniques (within the block 1150), is output for use in a device that is operable to receive the RF audio/video signal.

In view of the above detailed description of the invention and associated drawings, other modifications and variations will now become apparent. It should also be apparent that such other modifications and variations may be effected without departing from the spirit and scope of the invention.

What is claimed is:

1. An integrated circuit, comprising:
   an all digital modulator that is operable to generate a Radio Frequency (RF) modulated audio/video output signal using all digital techniques; and
   an output that provides the RF modulated audio/video output signal off chip; and wherein:
   the all digital modulator includes an audio/video processor that is operable to encode an audio/video signal thereby generating the RF modulated audio/video signal;
   an audio processor, communicatively coupled to the audio/video processor, that performs audio processing on at least one of a baseband audio source signal and a multiplex audio signal thereby generating a processed audio signal;
   a video processor, communicatively coupled to the audio/video processor, that performs video processing of a composite video signal thereby generating a processed video signal; and
   wherein the audio/video processor combines the processed audio signal and the processed video signal into the audio/video signal.

2. The integrated circuit of claim 1, wherein:
   the integrated circuit is implemented within a Set Top Box (STB).

3. The integrated circuit of claim 1, wherein:
   the RF modulated audio/video signal is a channel 3/4 RF modulated audio/video signal; and
   the channel 3/4 RF modulated audio/video signal is provided off chip to a display.

4. The integrated circuit of claim 1, wherein:
   the output that provides the RF modulated audio/video signal off chip is communicatively coupled to a High Definition Television (HDTV).

5. The integrated circuit of claim 1, the baseband audio source signal is a Pulse Code Modulation (PCM) baseband audio source signal; and
   the multiplex audio signal is a Broadcast Television Systems Committee (BTSC) multiplex audio signal.

6. The integrated circuit of claim 1, wherein the video processor performs pre-compensation for a group delay distortion within the composite video signal.

7. The integrated circuit of claim 1, wherein the video processor scales and shifts the composite video signal to meet depth of modulation filtering requirements.

8. The integrated circuit of claim 1, wherein the audio processor includes an audio trap filter that removes a video component in an audio band of at least one of the baseband audio source signal and the multiplex audio signal.

9. The integrated circuit of claim 1, wherein the all digital modulator includes at least one Digital to Analog Converter (DAC) that is operable to transform a digital signal into an analog signal, wherein the analog signal being directly output from the integrated circuit off chip.

10. The integrated circuit of claim 1, wherein the output that provides the RF modulated audio/video signal off chip is communicatively coupled to a display device.

11. An integrated circuit that includes Set Top Box (STB) functionality, the integrated circuit comprising:
- an audio/video processor that is operable to encode an audio/video signal;
- an integrated Digital Signal Processor (DSP) functional block, directly connected to the audio/video processor, that is operable to modulate the audio/video signal to generate a Radio Frequency (RF) modulated audio/video signal;
- an audio processor, communicatively coupled to the audio/video processor, that performs audio processing on at least one of a Pulse Code Modulation (PCM) baseband audio source signal and a Broadcast Television Systems Committee (BTSC) multiplex audio signal thereby generating a processed audio signal;
- a video processor, communicatively coupled to the audio/video processor, that performs video processing of composite video signal thereby generating a processed video signal; and wherein:
- the audio/video processor combines the processed audio signal and the processed video signal into the audio/video signal; and
- the integrated circuit is operable to provide the RF modulated audio/video signal off chip.

12. The integrated circuit of claim 11, wherein the RF modulated audio/video signal that is provided off chip includes a channel 3/4 RF modulated audio/video signal.

13. The integrated circuit of claim 11, wherein:
- the integrated circuit being one of a plurality of integrated circuits implemented within a Set Top Box (STB).

14. The integrated circuit of claim 11, wherein the video processor performs pre-compensation for a group delay distortion within the composite video signal that is substantially generated by the integrated circuit that includes STB functionality.

15. The integrated circuit of claim 11, wherein the video processor scales and shifts the composite video signal to meet depth of modulation filtering requirements.

16. The integrated circuit of claim 11, wherein the audio processor includes an audio trap filter that removes a video component in an audio band of at least one of the PCM baseband audio source signal and the BTSC multiplex audio signal.

17. The integrated circuit of claim 11, wherein the integrated circuit is communicatively coupled to an MPEG-2 (Motion Picture Expert Group, level 2) encoder; and
- the MPEG-2 encoder operates cooperatively with the integrated circuit to support NTSC/PAL (National Television System Committee/Phase Alternating Line) MPEG-2 encoding.

18. The integrated circuit of claim 11, wherein the integrated circuit that includes STB functionality includes a video clock synchronization loop that supports an asynchronous operational mode.

19. The integrated circuit of claim 11, wherein the integrated circuit that includes STB functionality is operable to support Personal Video Recording (PVR) functionality.

20. The integrated circuit of claim 11, wherein the integrated circuit that includes STB functionality is fabricated using CMOS (Complementary Metal Oxide Semiconductor) processing.

21. The integrated circuit of claim 11, wherein the integrated circuit that includes STB functionality is operable to provide the audio/video signal off chip in a form of at least one of a component video signal, a composite video signal, and an S-video signal.

22. An integrated circuit that includes Set Top Box (STB) functionality, comprising:
- an audio processor that is operable to perform audio processing on at least one of a Pulse Code Modulation (PCM) baseband audio source signal and a Broadcast Television Systems Committee (BTSC) audio multiplex signal thereby generating a processed audio signal;
- a video processor that is operable to that performs video processing of the composite video signal thereby generating a processed video signal;
- an audio/video processor, communicatively coupled to the audio processor and the video processor, that is operable to combine the processed audio signal and the processed video signal into an audio/video signal;
- an integrated Digital Signal Processor (DSP) functional block, communicatively coupled to the audio/video processor, that is operable to modulate the audio/video signal to generate a Radio Frequency (RF) modulated audio/video signal;
- wherein the video processor scales and shifts the composite video signal to meet depth of modulation filtering requirements; and
- wherein the integrated circuit is operable to provide the RF modulated audio/video signal off chip.

23. The integrated circuit of claim 22, wherein the RF modulated audio/video signal that is provided off chip includes a channel 3/4 RF modulated audio/video signal.

24. The integrated circuit of claim 22, wherein the video processor performs pre-compensation for a group delay distortion within the composite video signal that is substantially generated by the integrated circuit that includes STB functionality.

25. The integrated circuit of claim 22, wherein:
- the integrated circuit is communicatively coupled to an MPEG-2 encoder (Motion Picture Expert Group, level 2); and
- the MPEG-2 encoder operates cooperatively with the integrated circuit to support NTSC/PAL (National Television System Committee/Phase Alternating Line) MPEG-2 encoding.

26. The integrated circuit of claim 22, wherein the integrated circuit includes a video clock synchronization loop that supports an asynchronous operational mode.

27. The integrated circuit of claim 22, wherein the integrated circuit that includes STB functionality is operable to support Personal Video Recording (PVR) functionality.

28. The integrated circuit of claim 22, wherein the integrated circuit that includes STB functionality is fabricated using CMOS (Complementary Metal Oxide Semiconductor) processing.

29. The integrated circuit of claim 22, wherein the integrated circuit is operable to provide the audio/video signal off chip in a form of at least one of a component video signal, a composite video signal, and an S-video signal.

30. The integrated circuit of claim 22, wherein the audio processor includes an audio trap filter that removes a video component in an audio band of at least one of the PCM baseband audio source signal and the BTSC multiplex audio signal.

31. An integrated circuit that includes Set Top Box (STB) functionality, comprising:
   an audio processor that is operable to perform audio processing on at least one of a Pulse Code Modulation (PCM) baseband audio source signal and a Broadcast Television Systems Committee (BTSC) multiplex audio signal thereby generating a processed audio signal;
   a video processor that is operable to that performs video processing of a composite video signal thereby generating a processed video signal;
   an audio/video processor, communicatively coupled to the audio processor and the video processor, that is operable to combine the processed audio signal and the processed video signal into an audio/video signal;
   an integrated Digital Signal Processor (DSP) functional block, communicatively coupled to the audio/video processor, that is operable to modulate the audio/video signal to generate a channel 3/4 Radio Frequency (RF) modulated audio/video signal;
   a video clock synchronization loop that supports an asynchronous operational mode;
   wherein the integrated circuit is operable to provide the channel 3/4 RF modulated audio/video signal off chip;
   wherein the video processor performs pre-compensation for a group delay distortion within the composite video signal that is substantially generated by the integrated circuit that includes STB functionality;
   wherein the video processor scales and shifts the composite video signal to meet depth of modulation filtering requirements;
   wherein the audio processor includes an audio trap filter that removes a video component in an audio band of at least one of the PCM baseband audio source signal and the BTSC multiplex audio signal;
   wherein the integrated circuit is operable to provide the audio/video signal off chip in a form of at least one of a component video signal, a composite video signal, and an S-video signal; and
   wherein the integrated circuit is fabricated using CMOS (Complementary Metal Oxide Semiconductor) processing.

32. The integrated circuit of claim 31, wherein:
   the integrated circuit is communicatively coupled to an MPEG-2 encoder (Motion Picture Expert Group, level 2); and
   the MPEG-2 encoder operates cooperatively with the integrated circuit to support NTSC/PAL (National Television System Committee/Phase Alternating Line) MPEG-2 encoding.

33. The integrated circuit of claim 31, wherein the integrated circuit that includes STB functionality is operable to support Personal Video Recording (PVR) functionality.

34. An all digital Radio Frequency (RF) modulator method, comprising:
   operating an all digital RF modulator for encoding an input signal thereby generating an encoded audio/video signal;
   operating the all digital RF modulator for modulating the encoded audio/video signal to generate an RF signal using digital signal processing techniques;
   from the all digital RF modulator, outputting the RF modulated signal off chip receiving a composite video signal; and
   performing video processing on the composite video signal, that involves performing pre-compensation for a group delay distortion within the composite video signal, thereby generating a processed video signal.

35. The method of claim 34, wherein the RF modulated signal is a channel 3/4 RF modulated audio/video signal.

36. The method of claim 34, wherein:
   the method being performed within a Set Top Box (STB).

37. The method of claim 34, wherein:
   the method being performed within an integrated circuit.

38. The method of claim 34, further comprising:
   receiving at least one of a Pulse Code Modulation (PCM) baseband audio source signal and a Broadcast Television Systems Committee (BTSC) multiplex audio signal; and
   performing audio processing on at least one of the PCM baseband audio source signal and the BTSC multiplex audio signal thereby generating a processed audio signal.

39. The method of claim 34, further comprising:
   receiving at least one of a Pulse Code Modulation (PCM) baseband audio source signal and a Broadcast Television Systems Committee (BTSC) multiplex audio signal;
   performing audio processing on at least one of the PCM baseband audio source signal and the BTSC multiplex audio signal thereby generating a processed audio signal;
   combining the processed audio signal and the processed video signal into an audio/video signal; and
   encoding the audio/video signal to generate the encoded audio/video signal.

40. The method of claim 39, wherein the audio processing involves performing audio trap filtering to remove a video component in an audio band of at least one of the PCM baseband audio source signal and the BTSC multiplex audio signal.

41. An all digital Radio Frequency (RF) modulator method, comprising:
   receiving a composite video signal;
   performing video processing on the composite video signal thereby generating a processed video signal;
   receiving at least one of a Pulse Code Modulation (PCM) baseband audio source signal and a Broadcast Television Systems Committee (BTSC) multiplex audio signal;
   performing audio processing on at least one of the PCM baseband audio source signal and the BTSC multiplex audio signal thereby generating a processed audio signal;
   combining the processed audio signal and the processed video signal into an audio/video signal;
   encoding the audio/video signal to generate an encoded audio/video signal;
   modulating the encoded audio/video signal to a RF signal using digital signal processing techniques; and
   outputting the RF modulated signal off chip.

42. The method of claim 41, wherein the RF modulated signal is a channel 3/4 RF modulated audio/video signal; and
   further comprising providing the channel 3/4 RF modulated audio/video signal to a display.

* * * * *

UNITED STATES PATENT AND TRADEMARK OFFICE
CERTIFICATE OF CORRECTION

PATENT NO.       : 7,847,864 B1
APPLICATION NO.  : 10/372427
DATED            : December 7, 2010
INVENTOR(S)      : Steven Jaffe et al.

It is certified that error appears in the above-identified patent and that said Letters Patent is hereby corrected as shown below:

Col. 12, line 24, in Claim 22, after "that is operable to" replace "that performs" with --perform--
Col. 13, line 17, in Claim 31, after "that is operable to" replace "that performs" with --perform--

Signed and Sealed this
Nineteenth Day of June, 2012

David J. Kappos
*Director of the United States Patent and Trademark Office*